(12) United States Patent
Lange et al.

(10) Patent No.: US 7,853,832 B2
(45) Date of Patent: Dec. 14, 2010

(54) SYSTEM AND METHOD FOR TRACING CABLE INTERCONNECTIONS BETWEEN MULTIPLE SYSTEMS

(75) Inventors: Andrew Snowden Lange, Culver City, CA (US); Scott William Nelson, Paris (FR)

(73) Assignee: Alcatel Lucent, Paris (FR)

( * ) Notice: Subject to any disclaimer, the term of this patent is extended or adjusted under 35 U.S.C. 154(b) by 675 days.

(21) Appl. No.: 11/907,176

(22) Filed: Oct. 10, 2007

(65) Prior Publication Data

US 2009/0100298 A1 Apr. 16, 2009

(51) Int. Cl.
G06F 11/00 (2006.01)
(52) U.S. Cl. .......................... 714/45; 709/231
(58) Field of Classification Search .............. 370/380, 370/228, 242, 469, 355, 231, 352, 508, 468, 370/474, 466, 235
See application file for complete search history.

(56) References Cited

U.S. PATENT DOCUMENTS

| | | | | |
|---|---|---|---|---|
| 5,280,251 A * | 1/1994 | Strangio | ...................... | 324/539 |
| 5,883,901 A * | 3/1999 | Chiu et al. | ................... | 370/508 |
| 6,246,668 B1 * | 6/2001 | Kusyk | ......................... | 370/228 |
| 6,477,486 B1 * | 11/2002 | Ram et al. | ................... | 702/188 |
| 6,683,850 B1 * | 1/2004 | Dunning et al. | ............. | 370/231 |
| 6,810,415 B2 * | 10/2004 | Allen et al. | ................... | 709/219 |
| 6,968,994 B1 | 11/2005 | Ashwood Smith | | |
| 7,085,287 B1 * | 8/2006 | Chapman | .................... | 370/468 |
| 7,173,929 B1 * | 2/2007 | Testardi | ...................... | 370/355 |
| 7,191,244 B2 * | 3/2007 | Jennings et al. | ............. | 709/231 |
| 7,197,052 B1 * | 3/2007 | Crocker | ...................... | 370/474 |
| 7,227,844 B1 * | 6/2007 | Hall et al. | ................... | 370/242 |
| 7,337,217 B2 * | 2/2008 | Wang | ........................ | 709/217 |
| 7,519,083 B2 * | 4/2009 | Stevenson et al. | ........... | 370/469 |
| 7,672,332 B1 * | 3/2010 | Chapman | .................... | 370/468 |
| 7,684,332 B2 * | 3/2010 | Ray et al. | .................... | 370/235 |
| 2002/0199203 A1 * | 12/2002 | Duffy et al. | ................. | 725/109 |
| 2003/0109267 A1 | 6/2003 | Bulut | | |
| 2005/0089027 A1 * | 4/2005 | Colton | ........................ | 370/380 |
| 2007/0195817 A1 * | 8/2007 | Denney et al. | .............. | 370/468 |
| 2008/0002669 A1 * | 1/2008 | O'Brien et al. | ............. | 370/352 |
| 2008/0016402 A1 * | 1/2008 | Harel et al. | ................... | 714/43 |
| 2008/0301291 A1 * | 12/2008 | Westin | ........................ | 709/224 |
| 2008/0314979 A1 * | 12/2008 | Johnsen et al. | .............. | 235/385 |

* cited by examiner

*Primary Examiner*—Thong H Vu
(74) *Attorney, Agent, or Firm*—Kramer & Amado P.C.

(57) ABSTRACT

Techniques to ascertain physical cabling connections of electronic systems are provided for situations where there are numerous systems interconnected by a very large number of electrical or optical cables. A cable identifying code is inserted into a message sent from a local endpoint system to remote endpoint system over the identified cable. Each intermediate system that is in the interconnection path between the two endpoint systems of interest appends its code for the cable connected to the I/O port from which the message will egress that system and be sent to the next system along the path. The remote endpoint system receives the message which now contains codes for all the cables transited along the path, extract the codes, and thereby determines the exact cabling used in the interconnection of the two endpoint systems.

26 Claims, 3 Drawing Sheets even identical optical cables running into and out of it; it can take two people three days to connect just 500 of them." Therefore, it is important that cables are connected to their specific place on the equipment correctly and fast.
SYSTEM AND METHOD FOR TRACING CABLE INTERCONNECTIONS BETWEEN MULTIPLE SYSTEMS

FIELD OF THE INVENTION

The invention is directed to communication networks and in particular to a system and method for tracing cabling interconnections between multiple systems.

BACKGROUND OF THE INVENTION

Evolution of network technologies resulted in a world of interconnected networks where businesses and households are now amazingly close to each-other. The notion of "network" turns out to be central to our times: the Internet, LANs, WANs, enterprise networks, home networks, etc. are today interconnected over the World Wide Web, changing our lives and the way we do business. This evolution presents significant challenges to service and network providers, which attempt to serve their clients faster and better, by continuously enlarging and upgrading their networks with a view to serve a growing number of client and to implement the latest advances in networking technologies.

Typically, the equipment making up these networks is situated in environmentally hardened enclosures, such as cabinets, central offices or point-of-presence offices, which enclosures are generally environmentally controlled. Because the cost of space in these environments is high, the equipment is commonly organized in the most compact manner that is practical. As a result, there is often a confusing collection of cabling running through the environment to interconnect the equipment within the respective location (office, cabinet, etc.) to both other equipment within the location and equipment outside of the location.

In particular, network deployment and upgrading present complex challenges to providers, one of which is interconnection between equipment (also referred to here as systems) of various sizes, makes and functionality that made-up the network. To use an example provided on the HP website at http://www.hpl.hp.com/research/about/asset_tracking.html: "a single rack of servers might have 2,000 identical optical cables running into and out of it; it can take two people three days to connect just 500 of them." Therefore, it is important that cables are connected to their specific place on the equipment correctly and fast.

In the case of upgrades, techniques to ascertain the existing physical cabling connections between various systems within a certain location are particularly useful. These techniques would also apply to cabling connections of electronic systems in general, in situations where there are numerous systems to be interconnected at a particular installation site and there is a very large number of electrical or optical cables interconnecting-them, such that there exists a very real possibility of incorrect connections. In these cases, determining the exact nature of any interconnection errors would be a very onerous and time consuming task. In addition, these techniques need also to be equally applicable to cables made of optical fiber or copper.

It is known to attach identifying tags to cabling; this may be as simple as attaching a paper tag with a tie-wrap or writing on a piece of tape that is adhered to the cable. However, physical tags may become separated from the cables and the labels may be rendered illegible. Further, locating a particular tag amongst a great many tagged cables in a crowded environment may be difficult.

It is also known to use unique connectors. The connectors may be affixed to multiple cables and have a geometry that allows insertion into only one type of device in one particular way. However, the connectors must be connected to the cables in the proper way. Further, designing and manufacturing unique connectors for a very large number of cables is difficult and relatively costly because each can only serve a particular function and production runs tend to be in relatively small numbers.

Radio Frequency Identification (RFID or RF-ID) technology, although nascent, is known for improving supply chain efficiency by facilitating tracking of goods. For example, RFID may displace the bar codes currently used to identify products. An RFID tag is a small, inexpensive circuitry chip which stores data such as a product's expiration date and Electronic Product Code (EPC). The circuitry is responsive to a particular RF signal transmitted by a reader to generate a corresponding signal including the stored data. The range of the corresponding signal is dependent on various factors, but may be effective up to ten meters.

For example, Hewlett Packard and Connectivity Technologies offer solutions in this area, particularly using RFID tags at the ends of cables and RFID readers at the connection ports of systems: the readers identify the endpoint of cables that should be connected to the ports. The cable identification information is then sent to an Operation Support System (OSS) or Network Management System (NMS) that uses the information to determine the interconnection of the systems, which is made available to an operator, e.g. as a network map. However, not only does this solution require an OSS or NMS capable of receiving and processing the interconnection information, it also requires that all systems participating in this solution have RFID readers at their port connectors. Retrofitting or replacing the I/O cards of legacy systems to include the required RFID readers may not be practical or cost-effective in many cases.

In summary, the above solutions are not cost-effective when applied to legacy systems or when an OSS/NMS is not present in the network, or it is present but it does not support the respective solutions.

It has also been proposed a system for locating the geographical position of network elements in a network, as described in the U.S. patent application 20030109267 (Bulut) filed on Jun. 12, 2003 and entitled "Network element locating system". This patent application describes equipping network equipment with locators and connecting into the network a position manager. The locators acquire location information for the respective equipment and store it as position data. The equipment transmits the position data to the position manager over the network on request, and the position manger provides the user with the location of the equipment.

However, this solution is mostly concerned with locating the equipment in case of faults and does not address the problem of correctly connecting the cables to the equipment at a certain location.

It would be desirable to have a solution to determine the cabling interconnection of systems that at least does not require an RFID reader at both endpoints of a cable interconnecting two systems, or an OSS/NMS system enabled to receive and process the cabling interconnection information.

Furthermore, it would be desirable for such a solution to be capable of determining the exact cabling interconnection between two systems wherein the systems are interconnected via one or more intermediate systems.

SUMMARY OF THE INVENTION

It is an object of the invention to provide a system and method for tracing cabling interconnections between multiple systems of a communications network.

Accordingly, the invention provides a method for identifying cable interconnections between two systems connected along a cabling path over one or more intermediate systems, comprising: a) storing local interconnections information at each system, which includes a system identifying code and a cable identifying code that uniquely identifies a cable to be connected to the system; b) at the first end point, generating an interconnections trace message addressed to the second endpoint, the message including an interconnections information field; c) at the first system and each intermediate system, if any, updating the interconnections information carried by the interconnections trace message by appending the local interconnections information of the respective system and transmitting the interconnections trace message to a downstream system along the cabling path; and d) at the second system, extracting the interconnections information from the interconnections trace message and identifying all cables and systems along the cabling path.

The invention is also directed to a cabling interconnection identification unit installed on a system connected along a cabling path between a first and a second end systems, comprising: a receiver for receiving a forward interconnections trace message from an upstream system connected in the cabling path and a transmitter for transmitting an updated forward interconnections trace message to a downstream system connected in the cabling path; a code memory for storing local interconnection information; and a processor for appending the local interconnection information to the forward interconnections trace message for obtaining the updated forward interconnections trace message.

Advantageously, the present solution could be readily used by the network and services providers in that it offers, in addition to the existing solutions, verification of cabling interconnection of multiple systems without requiring an OSS or an NMS. That is, verification that can be performed at the node level and incorporated with higher level troubleshooting tools for enhanced effectiveness and capability.

Another advantage of the invention is that it reduces the time taken to troubleshoot cabling interconnection problems of communications equipment, both electrical and optical interconnections, as well as other types of electronic systems in general.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

Figure 1:
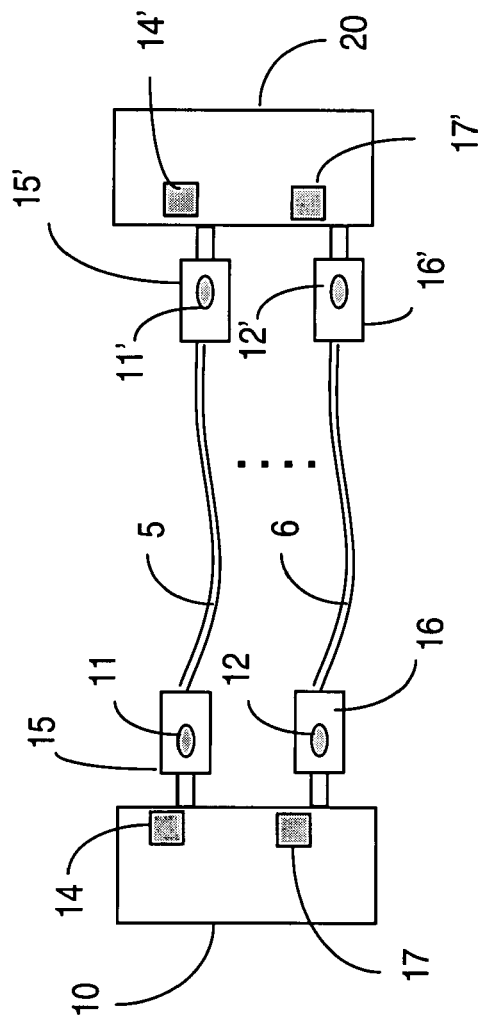
FIG. 1 illustrates a current solution used for tracing cabling interconnections.

FIG. 1 (Prior art) illustrates one of the current solutions used for tracing cabling interconnections using radio frequency identification tags. In this example, cables 5 and 6 operatively connect two units of equipment 10 and 20. A RFID pairs of tags 11, 11' and 12, 12' are affixed proximate to each end of the cables 5 and respectively 6. Preferably, the tags are embedded in the respective connector 15, 15' and 16, 16' mounted at the end of the respective cables 5 and 6. The tags store cable identity data that distinguishes the cables from each other, distinguishes the ends of the cables, and identify the equipment and ports the cables should connect to. The identity data may include additional data to specify further information about the cable or the connector, etc. For example, in the case of an optical fiber cable, the additional data may indicate the fiber type so that the properties for a laser that will be used to produce signals transmitted on the fiber may be selected either automatically or manually. This cable identity data is generally provisioned in a local memory provided on the tag via a configuration procedure.

Each tag also includes a small RF transmitter that emits the identity information for the respective cable end/connector. The tags are employed with readers 14, 17 and 14', 17' embedded in the matching network devices 10 and 20 at a respective connection point. In general, each connection point on the devices 10, 20 is selected proximate to the port where the cable should be inserted. The transmitters on the RFID tags and the readers on the connection points are configured to have a relatively small active range, e.g., which is less than the distance between physical ports on the network device. In this way, the tag data is read by the embedded reader only when the cable is quite close to, or connected to the port. The connection points are also provided with a memory preconfigured with the information needed to identify the cable that should be connected to its associated port. An alarm/error signal advises the operator that a cable has been inserted in the wrong connection point, if the connector identity data stored at the connection point differs from the data stored in the tag.

With RFID cable tracking in place, system managers have an accurate, real-time record of where every cable is placed, making repairs and upgrades faster, more accurate, and easier to plan, manage and perform.

The cable identification information is then sent to an OSS or network management system (NMS) that uses the information to determine the interconnection of the systems or network topology, which is made available to an operator, e.g. as a network map. As indicated above, not only does this solution require an OSS or NMS capable of receiving and processing the interconnection information, it also requires that all systems participating in this solution have RFID readers at their port connectors. Retrofitting or replacing the I/O cards of legacy systems to include the required RFID readers may not be practical or cost-effective in some cases. Also, the solution described in connection with FIG. 1 is not capable of determining the exact cabling interconnection between two systems wherein the systems are interconnected via one or more intermediate systems.

Figure 2:
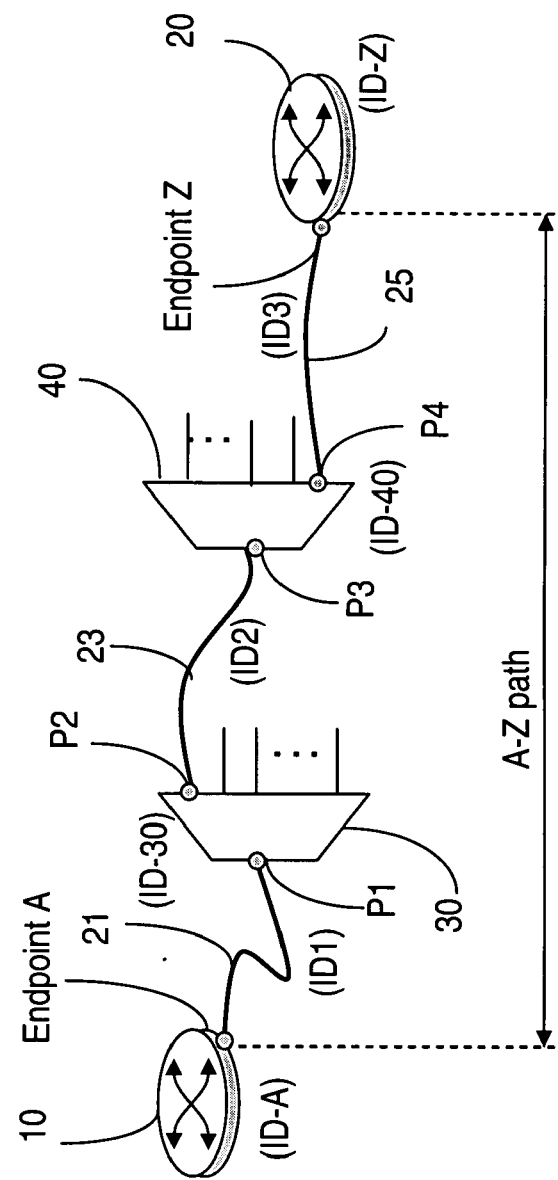
FIG. 2 shows an example for a solution for tracing interconnections information according to an embodiment of the invention.

The basic idea according to the invention is illustrated in FIG. 2. FIG. 2 shows an interconnection path, denoted with A-Z path, between two connection points A and respectively Z on respective end systems 10 and 20. For clarity, we use the term "forward" for the direction A to Z and the term "reverse"

for the direction Z to A; terms "ingress" and "egress" are also used in the context of these traffic directions. These terms are relative terms used for clarity, and they should not be interpreted so as to narrow the scope of the appended claims.

The A-Z path includes cable 21 between end point A and ingress port P1 on intermediate system 30, cable 23 between egress port P2 on system 30 and ingress port P3 on system 40, and cable 25 connecting egress port P4 on system 40 with the end point Z. It is to be noted that the number of the intermediate systems 30, 40 is not limited to two as in the example of FIG. 2; rather the invention is applicable to any number of intermediate systems that may be inserted in the A-Z path. As such, for a number N of intermediate systems, the number of cables used to establish the A-Z path is N+1.

According to the invention, each cable 21, 23 and 25 is provided with an identifying code; let's denote these codes with ID1, ID2 and ID3. Similarly, the systems 10, 20, 30 and 40 are provided with identifying codes; let's denote these codes with ID-A, ID-30, ID-40 and ID-Z. The system identifying code and the cable identifying code, identifying the code(s) of the cable(s) that should be fitted in the associated port, may for example be provisioned in a memory associated with the connection point on the respective system. This operation can be done directly by an operator or may be provided via a specifically designed system. Alternatively, the cable identifying code may be received from the cable when first installed such as via RFID, and then stored in the connection point memory.

If so enabled, the system identification code may just identify the respective system, or may include more specific information, for the case when more connectivity points are considered for cabling interconnection traces. This information may be a port ID, including virtual port ID, if present. Also, the cable identifying codes may be correlated with trench identification information, so that the operator/provider will have the physical location of the cable recorded against the cable code. This could be done with a separate field (Trench/Conduit ID: 222) or embedded in the Cable ID value (Cable ID: 222-124111, where the first "222" indicated trench/conduit ID).

Alternatively, the cable identifying code may be transmitted from one connection point to another along the cable at installation. This solution allows one system to provision another, typically a downstream system. In the example of FIG. 2, system 10 may provision system 30 with identifying code ID1, system 30 will in turn provision system 40 with identifying code ID2, etc. Authentication could optionally be used to verify that the provisioned value came from an authorized system. Although, internal to a provider's network, the provider may choose to trust their own boxes and dispense with authentication.

It is to be noted that the path A-Z may connect heterogeneous systems. For example, the end systems 10 and 20 could be Layer-3 routers, and one of the intermediate systems may be a Layer-1 wavelength system. In this case, the system identification code for that intermediate system may be a wavelength identifying code. Similarly, an intermediate system may be identified using a VLAN ID code in the case of an Ethernet switch. This could be captured as part of the port ID; the port could also be a virtual port (Frame relay DLCI, ATM VPI/VCI, lambda ID, VLAN ID etc.).

In operation, the end point A inserts the cable identifying code ID1 and its identifying code ID-A into an interconnections trace message, also referred to as a cable trace message, and then sends the message towards the remote endpoint Z over cable 21. This message may be generated in response to a query by the operator at end point A. Alternatively, a test system, such as a handheld device could be used to send a probe that would determine the cable trace through the system.

Each intermediate system, such as devices 30 and 40 that are in the A-Z path interconnecting systems 10 and 20, appends its own identifying code and the respective identifying code for the cable connected to the I/O ports in the A-Z path. More specifically, port P2 on system 30 appends to the message the identifying code ID2 for cable 23 and its code ID-30, while port P4 on system 40 appends to the message the identifying code ID3 for cable 23 and its code ID-40.

The remote system 20 receives the interconnections trace message which now contains the identifying codes ID1, ID2 and ID3 for all the cables transited along the path, and the codes ID-A, ID-30, and ID-40 of all systems along the path A-Z, extracts the codes, and thereby determines the exact cabling used in the interconnection of the two endpoint systems. In this way, the endpoint Z collects specific connectivity information for the path A-Z, which provides not only the physical topology of the path, but also the underlying physical routing.

The endpoint Z processes the packet/frame with the interconnections trace message; this processing may involve storing the message locally for display, displaying the message or transmitting it to another system if need be, etc.

It is also to be mentioned that the cabling interconnections between system 20 and system 10 may be identified in a similar way (in the reverse direction that that described above). Therefore, bi-directional interconnections tracing may be performed according to the invention, in which case the cable identifying code should be the same no matter which end you're connecting to (irrespective of the direction). In this case the receiving system needs to be configured to accept a provisioned value. However, if the cable between two systems is not bidirectional, then the cable ID is preferably read from the cable upon insertion.

Also, should inverse multiplexing be supported on a lower level link/system, then all the paths from that system downstream could be provided across a plurality of trace message; the specific path that the trace travels would be difficult to ascertain since the optical system sprays this information across multiple links. An example of the above scenario is an A-Z path that includes an intermediate optical system which inverse multiplexes a higher-rate serial signal on multiple lower-rate wavelengths or cables. If the optical system is capable, it could provide both the total inverse multiplexing links, only the ones the probe traverses, or both.

Figure 3:
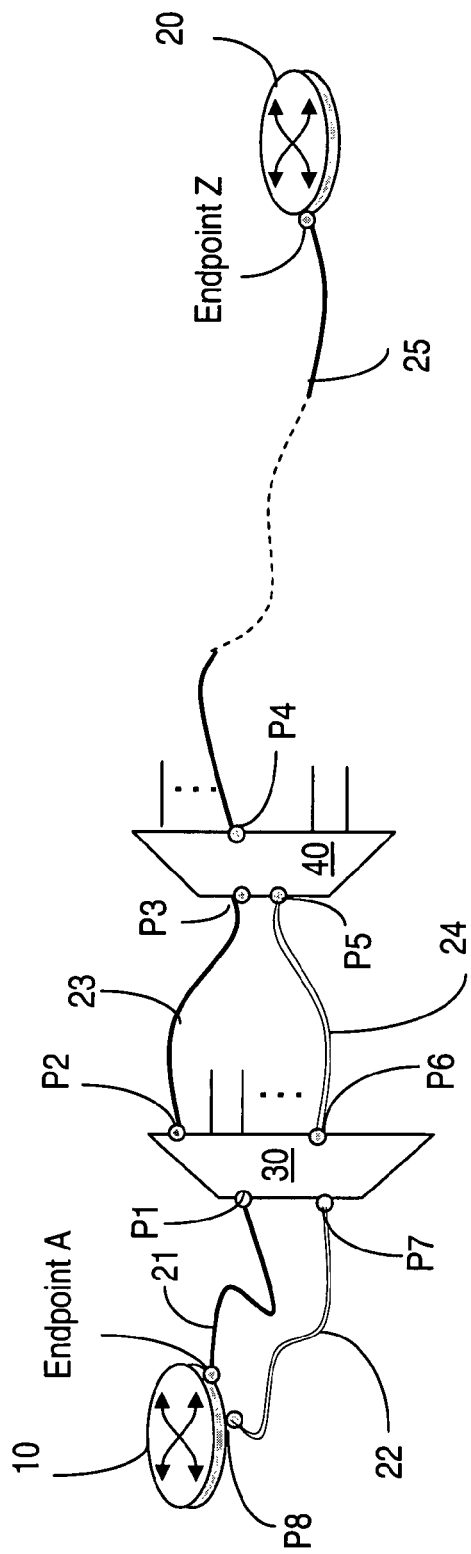
FIG. 3 shows an example for tracing interconnections information according to another embodiment of the invention.

FIG. 3 is an example of a solution for tracing cabling interconnections according to another embodiment of the invention. In this embodiment, intermediate system 40 is adapted to generate a loopback cabling identification message for tracing cabling interconnections for a return path. In this embodiment, destination system 20 or any intermediate system in the A-Z path could in fact loopback the ingress trace message to the originating system 10. Nonetheless, the interconnections trace message must identify the intermediate/end system that is required to loop back the message; in the example of FIG. 3, system 40 should be identified in the trace message. This looped back message travels back to the originator of the trace message (system 10) and identifies the end/intermediate systems it passes in the way to the originator of the trace message. Alternatively, the originator could request another reporting destination, or the end-system could be configured to report to another destination, or even multiple destinations. The loopback trace message should also indicate that it is a looped back message.

The interconnection information collected according to the invention can be integrated with higher-level troubleshooting tools; a good example is use of this information for obtaining an extended traceroute. To this end, an option to include this connectivity information could be added to the IP traceroute command. The IP traceroute command would work normally, and the connectivity information provided by the invention will specify to the operator the cable routings between each IP hop. In one embodiment, the ingress/egress IP node proxies the cable-trace command.

A layer of policy control between operators can also be readily provided. Thus, if the provider wishes to configure the trace message so that a specified operator is not allowed to see a certain cable identifying code, then a traceroute with that option to return the interconnections information is not allowed, by not having the IP node run the cable-trace command, instead just returning the normal traceroute output.

To summarize, a first embodiment (FIG. 2) uses a one-way interconnections trace message where the end system 20 determines and processes the cabling interconnections between systems 10 and 20. Optionally, the end system 20 may be designed so as to return a reverse interconnections trace message for identifying the reverse cabling interconnections between systems 20 and 10. The second embodiment (FIG. 3) uses a two-way interconnections trace message, where the paths in both directions are traced and provided to the source system.

Figure 4:
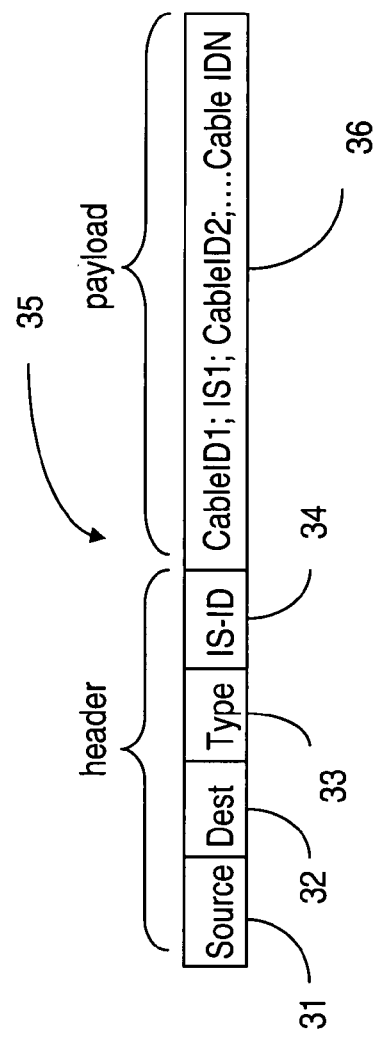
FIG. 4 shows an example of the interconnections trace message according to the invention.

FIG. 4 shows an example of an interconnections trace message 35. The header of message 35 provides the source address of the interconnections trace message in field 31 and the destination address in field 32, which are systems 10 and respectively 20. A type identification field 33 indicates if the message is a trace message and further specifies if it is of a one-way or two-way type. Field 34 is used in the case of a two-way message to identify the intermediate system that loops back the message. Alternatively, the loop-back system may be identified in the destination address field 32, in which case there is no need for field 34. The payload field 36 is completed with the identities of the cables and systems as successively encountered along the way of the message; this data is referred to as the interconnections information.

Message 35 may be formatted according to a plurality of protocols, depending on the type of network it is used for. If the systems launching and processing the messages are layer-3 aware systems (routers), the address fields 31 and 32 include the IP addresses of the routers at the ends of the path of interest. The end systems may be Ethernet switches, identified by a MAC addresses in fields 31 and 32. Other protocols may be used for generating the message, according to the type of the end systems. If an intermediate system in the path is not l3/l2 packet aware, then it could only report on the trace messages originated by others, or originate trace messages to be read elsewhere, or originate trace messages with a loop-back that is local to its cabling domain.

Figure 5:
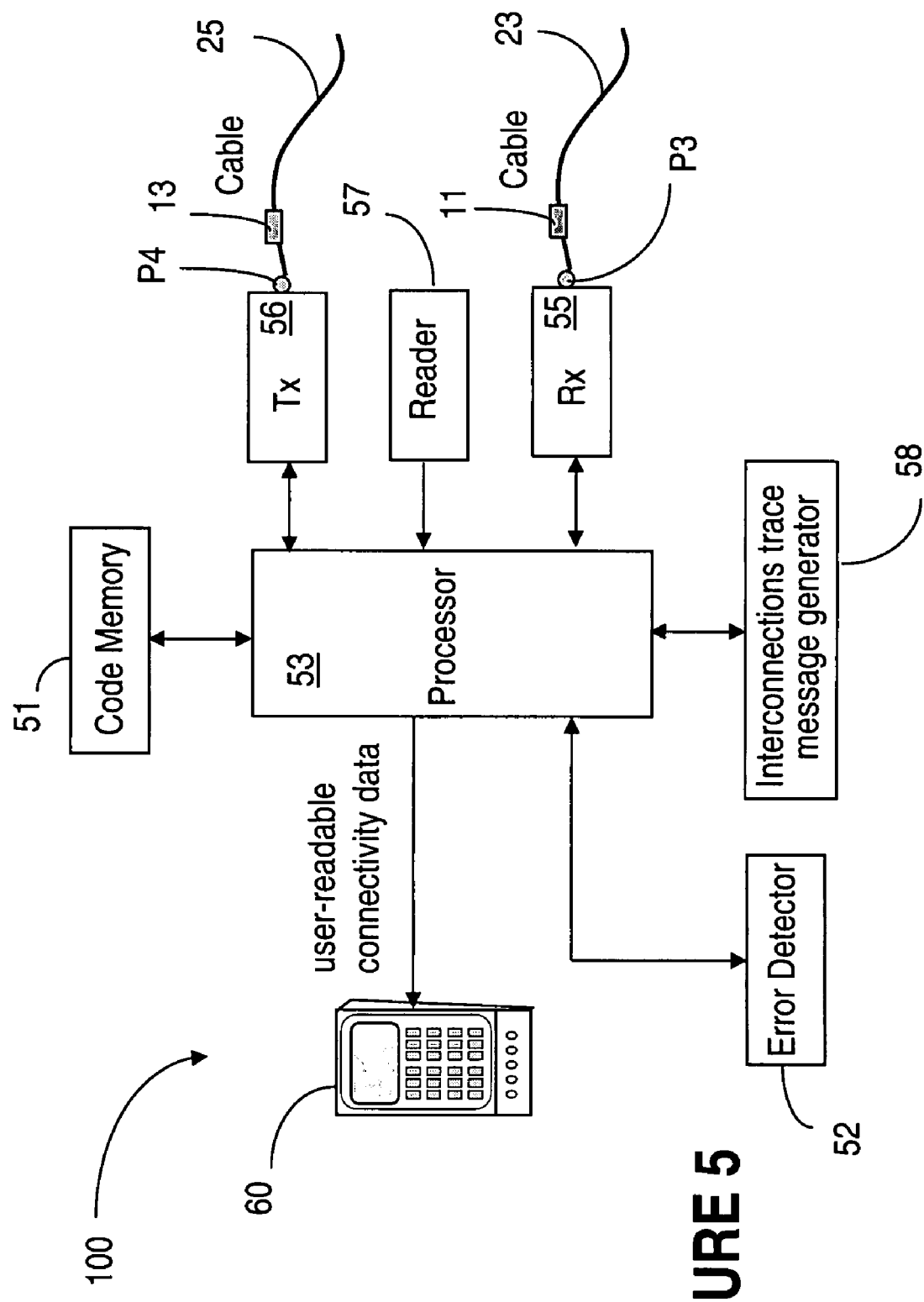
FIG. 5 shows the block diagram of a code identification unit provided at a system for enabling identification of cables interconnections.

FIG. 5 illustrates the block diagram of a cabling interconnections identification unit 100 that provided at a system enabled with this invention, and in particular illustrates the units provided at an intermediate system. In the case of systems provided with a one-way trace message capability as shown in FIG. 2, an intermediate system, such as e.g. system 30, is equipped with a code memory 51 that stores local interconnections information pertaining to the respective system/egress point and the associated cable. In this example, this information is for example the system identification code IS1 of system 30 and the code identification of the cable 23 to be fitted in the respective port.

FIG. 5 also shown an interconnections trace message generator 58 that generates the message by populating the fields with the source and destination address, the message type and the local interconnections information stored in memory 51. Generator 58 is used at the endpoint A for launching the trace message along the path A-Z, and/or at the intermediate systems enabled with loop-back.

In the case of the two-way as described in connection with the embodiment of FIG. 3, processor 53 is designed to loopback the cabling interconnection trace messages, in which case the receiver 55 is replaced with a transceiver, which launches the return trace message back on cable 23 towards the source end of the A-Z path. As indicated above, the end system as well as any intermediate system may be enabled to loopback the interconnections trace message. When processor 53 performs a look-up on field 33 of the message it recognizes that it should generate a loopback message. System 30 in this example provides its address in the loopback message and causes the transceiver 55 to launch the loopback message back to the originator of the trace message (system 10). As indicated above, the return trace message also indicates that it is a looped back message.

If more than one cable egress a system, each port and each cable should be also identified by local interconnections information in code memory 51. Thus, the local interconnections information in this case includes the identifying codes for all ports, associated with the identifying codes of the respective cables to be connected these ports on the system. It is also possible to use a private DNS server to index the values of cable ID's into user-readable values. Still further, user-readable values could be embedded directly as the cable and system identifying codes in memory 51.

Identification unit 100 also comprises a receiver unit 55 that receives the ingress interconnections trace message from the upstream system (system 10 in this case) over cable 23, and a transmitter unit 56 that transmits the egress interconnections trace message to the downstream system (system 40 in this example) over cable 25.

The heart of the cabling interconnections identification unit 100 is processor 53 that, in the case of a one way message as described in connection with the embodiment of FIG. 2, simply adds the system identification code, ID-30 in this example, to the incoming interconnections trace message.

As described in connection with FIG. 1, identification unit 100 may be equipped with an error detector 52 that issues an error signal whenever a wrong cable is connected to system 30 subsequently to the initial installation. The error signal may also indicate for example that one of the outgoing cable/port is unavailable. In embodiments where the port identification is available, the error message that identifies the port could help determine if all the failures seen correspond to the same physical-layer failure. The error signal can be in the form of a simple alarm raised when an error is detected which could be further processed locally by processor 53 with a view to provide a user readable error message. Alternatively, the error signal may be sent to a remote location for further analysis and correlation with other alarms received from other systems. Thus, the error signal can be sent to the source of the trace message, or to a management system, etc.

A reader 57 is provided optionally for the embodiments where identification code of cable 23 is not provisioned in memory 51, and needs to be read from the cable. In such a case, the cables 23, 25 may for example be equipped with a respective RF-ID tag 11, 13 as described above (see FIG. 1), which transmits the cable identification to the reader, which in turns uses processor 53 to store this information into code memory 51.

In another embodiment of the invention, the cabling connectivity information may be read by an operator at any system, as shown by device 60. To this end, processor 53 is enabled to output the data on request from the user and display it on the screen of apparatus 60 in a user readable format. Device 60 may be also used to read the error message if need be.

In the embodiments enabled to return the interconnections information to the source (although, as indicated above, the originator could request another reporting destination), the end-system 20 may be equipped with a transceiver 55 rather than a receiver, for enabling return of the information collected by the trace message to the source, on the same route. Alternatively, transmitter 56 may be used to this end, or an additional transmitter could be used when the interconnections trace message is configured to report to another destination, or to multiple destinations.

Preferably, the identification code for the systems along the A-Z path may include the port identification in addition to the system identification. This scenario is particularly suitable for cases when the path is routed along numerous intermediate systems. This connectivity information could be used to verify shared risk link groups (SRLGs) at the physical layer. Knowledge that a number M of A-Z paths are established from node 10 to node 20 through the same cable(s) is very useful in re-provisioning or re-optimizing the network to avoid a single cable cut taking down many paths where it is not necessary.

The following example shows the results of what an interconnections trace message may look like, using the configuration shown in FIG. 2 with four systems and three cables. The operator of system 10 begins the test by entering the command "cabletrace system Z". Optionally, a specific egress port could be specified if multiple paths to system 20 exist; the example discusses only one for simplicity. System 10, a router, originates the trace message with a packet 35, containing its address, the address of system 20, and the indication that this is a one-way interconnections trace message. System 10 also inserts in the payload filed its identification ID-A and the identification ID1 of the cable 21. If so enabled, identification of system 10 may include more specific information, such as port ID, including virtual port ID, if present.

When this message is received by intermediate system 30, which is let's say an optical transport system, it appends its identification ID-30, and the identification ID2 of cable 23. The second intermediate system 40, also an optical transport system, does the same. When system 20, also a router, receives the interconnections trace message, examines it, determines that it is a one-way interconnections trace by seeing that the loopback option is not present, and returns the message contents to system 10. System 10 receives the reverse interconnections trace message from system 20 and provides the information to the operator who initiated the probe. The above steps are described next in more detail.

System A>Cabletrace systemZ

The operator initiates the command, the default port is used. Cabletrace to System Z (IP Address: 3.4.5.6), 30 hops maximum this line indicates the destination system, and the corresponding IP address. It also indicates a hop-count. This value can be used to prevent a loop. This should not occur in a cabled system, but is included for completeness.—

0 System: System A (source)

Egress Port ID: 1/3/1:100, -Cable ID: 135512 this line indicates the system ID of system 10, port ID (including virtual port, in this case, the number after the ":"), and cable ID1. A system may include egress port and cable ID, ingress port and cable ID or both. What it includes depends on how intelligent the system is. In this example both are included.—

1 System: IntSystem 1
   Ingress Port ID: 3/2/1, Cable ID: 135512
   Egress Port ID: 4/1/2, Cable ID: 001442
   this line indicates the address of ingress port P1, ID1 of cable 21, the address of egress port P2, and the ID2 of cable 23

2 System: Int System 2
   Ingress Port ID: 5/1/2, Cable ID: 001442
   Egress Port ID: 1/0/0, Cable ID: 140221
   this line indicates the address of ingress port P3, ID2 of cable 23, the address of egress port P4, and the ID3 of cable 25

3 System: System Z (destination)
   Ingress Port ID: 3/1/2, Cable ID: 140221
   this line indicates the address of endpoint Z, ID3 of cable 25

The next example illustrates how interconnections trace messages can be linked to other mechanisms. In this second example, the cable trace ability is combined with a common router path troubleshooting tool, the IP traceroute. In this example, the originating system wishes to get both cable information and IP routing information from one IP router to another. A possible way to express the traceroute command using the cable trace option of the invention for requesting the cable connectivity information is as follows:

System A>Traceroute System Z.network100.com—Cabletrace

In this example, the operator initiates an IP traceroute probe with an option that requests the intermediate IP systems to perform the cabletrace command in addition to the IP traceroute command and return the results to system 10. The least-indented results provided come from the IP traceroute, the indented results come from the results of the cabletrace run by each intermediate IP node on the cable path to the next IP hop.— traceroute to systemZ.network100.com (1.2.3.4), 30 hops max, 40 byte packets.

0 systemA.network100.com (1.2.5.3) 0.000 ms 0.000 ms 0.000 ms
   cabletrace:
   0 System: System A (source)
   Egress Port ID: 1/3/1:100, Cable ID: 135512
   1 System: IntSystem 1
   Ingress Port ID: 3/2/1, Cable ID: 135512
   Egress Port ID: 4/1/2, Cable ID: 001442
   2 System: Int System 2
   Ingress Port ID: 5/1/2, Cable ID: 001442
   Egress Port ID: 1/0/0, Cable ID: 140221
   3 System: System B (destination)
   Ingress Port ID: 3/1/2, Cable ID: 140221

1 systemB.network100.com (1.2.5.4) 0.544 ms 0.425 ms 0.464 ms
   cabletrace:
   0 System: System B (source)
   Egress Port ID: 1/1/1, Cable ID: 000500
   1 System: IntSystem 3
   Ingress Port ID: 1/2/1, Cable ID: 000500
   Egress Port ID: 6/3/2, Cable ID: 001445
   2 System: Int System 4
   Ingress Port ID: 1/1/1, Cable ID: 001445

Egress Port ID: 1/0/6, Cable ID: 145241
3 System: System C (destination)
Ingress Port ID: 1/1/2, Cable ID: 145241

2 systemC.networkloo.com (1.2.6.6) 3.226 ms 3.114 ms 3.099 ms cabletrace:
0 System: System C (source)
Egress Port ID: 2/1/1, Cable ID: 200500
1 System: System Z (destination)
Ingress Port ID: 3/1/1, Cable ID: 200500

3 systemZ.network100.com (1.2.3.4) 3.979 ms 3.984 ms 3.976 ms

A further example is provided here for illustrating a very useful application of the cabling interconnections trace according to the invention. It enables discovery of where the other end of a cable is connected, or in other words it answer the "where does this cable go" question. In this case, the operator initiates a cabletrace command which specifies a local port where an end of the cable is connected. A cable identifying code or interface name could also be specified as the source. The cable trace message will travel along this first cable and it can continue until a system where multiple paths might be taken is reached. Such a system could be for example a router or a switch. For example:
System A>Cabletrace Port 1/3/1—

In this example, the source port is specified (a port on system A)—Cabletrace on port 1/3/1, 30 hops maximum This line indicates the local port to begin the trace and the maximum hop count. This value can be used to prevent a loop. This should not occur in a cabled system, but is included for completeness.

0 System: System A (source)
Egress Port ID: 1/3/1, Cable ID: 135512 —
This line indicates the originating system's system identifying code, port ID, and the identifying code of the cable of interest. This line may specify an egress port and cable ID, ingress port and a cable ID, or both. What it includes depends on how intelligent the system is. In this example both are included, and also, in this example the trace arrives to the end system and identifies it.

1 System: IntSystem 1
Ingress Port ID: 3/2/1, Cable ID: 135512
Egress Port ID: 4/1/2, Cable ID: 001442

2 System: Int System 2
Ingress Port ID: 5/1/2, Cable ID: 001442
Egress Port ID: 1/0/0, Cable ID: 140221

3 System: System Z (destination)
Ingress Port ID: 3/1/2, Cable ID: 140221
The next example illustrates a cable trace where mismatched cable interconnection data provides useful information about state of the network.

1 System: IntSystem 1
Ingress Port ID: 3/2/1, Cable ID: 135512
Egress Port ID: 4/1/2, Cable ID: 001442

2 System: Int System 2
Ingress Port ID: 5/1/2, Cable ID: 771223
Egress Port ID: 1/0/0, Cable ID: 140221

It can be seen that the cable identifying code Cable ID: 001442 at the egress of an intermediate system (here Int System 1) does not match with that able identifying code Cable ID: 771223 at the ingress f the immediate downstream system (here Int System 2). In such a case, the cable trace could indicate that: a) there is a provisioning error somewhere in cable-id assignment/RFID assignment, or b) there are one or more systems that are between hops 1 and 2 that do not include the cable-trace capability. This may be displayed in a variety of ways in the output.

Numbers were used for cable identification codes in the examples, since it would save space in the code memory 51. But there is no reason the cable identification codes couldn't be text as well, although managing uniqueness in the case of text could be hard. Alternatively, a unique code as well as a text value could be used. For example: Conduit ID: San Francisco 10 Market to Santa Clara 1609 Walsh (ID#: 205).

We claim:

1. A method for identifying cable interconnections between two systems connected along a cabling path over one or more intermediate systems, comprising:
   a) storing local interconnections information at each system, which includes a system identifying code and a cable identifying code that uniquely identifies a cable to be connected to the system;
   b) at said first end point, generating an interconnections trace message addressed to said second endpoint, said message including an interconnections information field;
   c) at said first system and each intermediate system, if any, updating the interconnections information carried by said interconnections trace message by appending the local interconnections information of said respective system and transmitting said interconnections trace message to a downstream system along said cabling path; and
   d) at the second system, extracting said interconnections information from said interconnections trace message and identifying all cables and systems along said cabling path.

2. A method as claimed in claim 1, wherein said system identifying code includes a port identification.

3. A method as claimed in claim 1, wherein for a Layer-3 system, system identifying code includes an IP address.

4. A method as claimed in claim 1, wherein for a Layer-2 system, system identifying code includes an MAC address.

5. A method as claimed in claim 1, further comprising transmitting said interconnections trace message from said second system to one of said first system and any intermediate system for further processing.

6. A method as claimed in claim 1, further comprising transmitting said interconnections trace message from said second system to said first system for updating said interconnection information with cable connectivity information for a reverse cabling path between the second and the first system.

7. A method as claimed in claim 1, further comprising, whenever said systems are connected in a communications network equipped with a network management system, transmitting said interconnections trace message from said second system to said network management system.

8. A method as claimed in claim 1, wherein said systems and said cables are co-located at a central office of a communication network.

9. A method as claimed in claim 1, wherein said message comprises a type field for identifying a one-way message and a two-way message.

10. A method as claimed in claim 9, wherein said two-way message provides the address of a system along said cabling path designated to loop-back said message towards said first system, for tracing a reverse path from said system to said first system.

11. A method as claimed in claim 1, wherein step a) comprises provisioning said local interconnections information at each system at system installation.

12. A method as claimed in claim 1, wherein step a) comprises reading said cable identifying code from a respective cable when first installed.

13. A method as claimed in claim 1, wherein said interconnections trace message is provided to said system in the form of a cabletrace command.

14. A method as claimed in claim 13, wherein said cabletrace command is combined with an IP routetrace command.

15. A method as claimed in claim 1, wherein said interconnections trace message is transmitted in-band with the traffic traveling along the cabling path.

16. A method as claimed in claim 1, wherein said interconnections trace message is transmitted over an out-of-band control channel traveling along the cabling path.

17. A method for identifying a second end point of a cabling path from a first end point of said cabling path, said cabling path interconnecting a first and a second end systems, comprising:
  storing local interconnections information at each system, which includes a system identifying code and a cable identifying code that uniquely identifies a cable to be connected to the system;
  at said first end point, generating an interconnections trace message specifying the address of said first end point and including an interconnections information field;
  at said first system and each intermediate system, if any, updating the interconnections information carried by said interconnections trace message by appending the local interconnections information of said respective system and transmitting said interconnections trace message to a downstream system along said cabling path;
  at the second endpoint, updating the interconnections information with an identification of said second endpoint and
  processing said interconnection information updated with the identification of said second end point for identifying all cables and systems along said cabling path and said second end point.

18. A method as claimed in claim 17, wherein the address of said first end point includes any of an ingress port address, an egress port address, a cable identifying code and an interface name.

19. A cabling interconnection identification unit installed on a system connected along a cabling path between a first and a second end systems, comprising:
  a receiver for receiving a forward interconnections trace message from an upstream system connected in said cabling path and a transmitter for transmitting an updated forward interconnections trace message to a downstream system connected in said cabling path;
  a code memory for storing local interconnection information; and
  a processor for appending said local interconnection information to said forward interconnections trace message for obtaining said updated forward interconnections trace message.

20. A unit as claimed in claim 19, further comprising, at the first system, an interconnections trace message generator for generating said forward interconnections trace message.

21. A unit as claimed in claim 19, further comprising an interconnections trace message generator for generating a loopback interconnections trace message when said forward interconnections trace message is of a two-way type.

22. A unit as claimed in claim 19, further comprising, at the second system, an interconnections trace message generator for generating a return interconnections trace message for the first system for providing the first system with cabling interconnection information for the cabling path, on receipt of said forward interconnections trace message.

23. A unit as claimed in claim 19, further comprising an error detector for issuing an error signal whenever a wrong cable is connected to the system subsequently to the initial installation of said cable.

24. A unit as claimed in claim 23, wherein said error signal further identifies a port of said system.

25. A unit as claimed in claim 19, further comprising a reader for reading an RF-ID tag provided on a tag attached to a cable connected to said system and storing the identification information in said RFID tag into said code memory when the cable is first connected to said system.

26. A unit as claimed in claim 25, further comprising:
  a comparator for comparing said identification information stored in said in code memory with identification information presently read from a cable connected subsequently to said system; and
  an error detector for issuing an error signal whenever said identification information stored in said in code memory differs from the identification information presently read from a cable connected subsequently to said system.

* * * * *